United States Patent
Phillips et al.

(10) Patent No.: US 8,973,073 B2
(45) Date of Patent: Mar. 3, 2015

(54) WEIGHTED INGEST POLICY MANAGEMENT IN A CONTENT DISTRIBUTION NETWORK

(71) Applicant: Telefonaktiebolaget L M Ericsson (PUBL), Stockholm (SE)

(72) Inventors: Chris Phillips, Hartwell, GA (US); Jimmie Rodgers, Lawrenceville, GA (US); Jennifer Ann Reynolds, Duluth, GA (US); Robert Hammond Forsman, Sugar Hill, GA (US); Charles Hammett Dasher, Lawrenceville, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 33 days.

(21) Appl. No.: 13/898,125

(22) Filed: May 20, 2013

(65) Prior Publication Data

US 2014/0344879 A1    Nov. 20, 2014

(51) Int. Cl.
| | |
|---|---|
| *H04N 7/173* | (2011.01) |
| *H04N 7/16* | (2011.01) |
| *H04L 12/28* | (2006.01) |
| *H04N 21/238* | (2011.01) |
| *H04N 21/24* | (2011.01) |

(52) U.S. Cl.
CPC ..... *H04N 21/23805* (2013.01); *H04N 21/2402* (2013.01)
USPC ............ 725/115; 725/145; 370/389; 370/412

(58) Field of Classification Search
CPC ........ H04L 1/16; H04J 3/0664; H04J 3/0667; H04N 21/2368; H04N 21/23805; H04N 21/4341; H04N 21/6375
USPC .................. 370/389, 392, 412; 725/115, 145
See application file for complete search history.

(56) References Cited

U.S. PATENT DOCUMENTS

| | | | |
|---|---|---|---|
| 2007/0288518 A1 | 12/2007 | Crigler | |
| 2009/0177792 A1 | 7/2009 | Guo | |
| 2009/0252033 A1 | 10/2009 | Ramakrishnan | |
| 2011/0016225 A1 | 1/2011 | Park | |
| 2013/0070778 A1* | 3/2013 | Eberle et al. | ......... 370/412 |

FOREIGN PATENT DOCUMENTS

KR    10-2008-0039499 A    5/2008

OTHER PUBLICATIONS

ETSI TS 102 990 V1.1.1 (Nov. 2012) "Media Content Distribution (MCD); CDN Interconnection, use cases and requirements".*

* cited by examiner

*Primary Examiner* — Hai V Tran

(57) ABSTRACT

An ingestion controller, system, and method for managing ingestion of electronic content in a Content Distribution Network (CDN). The content is received from one or more content sources (CSs) through an inbound content pipe having a maximum bandwidth capacity. A database stores bandwidth weightings assigned to each CS by a network Policy Management System (PMS). The bandwidth weighting assigned to each CS corresponds to a fraction of the maximum bandwidth capacity of the inbound content pipe. An input buffer receives the content from the CSs in one or more input buffer queues associated with the CSs. A content retrieval mechanism retrieves the content from the input queues at an upload rate for each CS based at least on each CS's assigned bandwidth weighting, thereby causing a flow control mechanism to control the upload bitrate of each CS in proportion to the bandwidth weightings.

14 Claims, 8 Drawing Sheets

US 8,973,073 B2

WEIGHTED INGEST POLICY MANAGEMENT IN A CONTENT DISTRIBUTION NETWORK

TECHNICAL FIELD

This disclosure relates to a method and an apparatus for weighted policy management for ingesting video or audio content in a Content Distribution Network (CDN).

BACKGROUND

Network bandwidth is often congested, with multiple download or upload sessions competing for network resources. In existing file distribution systems (such as CDNs), files are uploaded from content sources to a "watch folder" for further distribution over operator networks that are not owned or controlled by either the content sources or the CDN owner. In such systems, content uploads from opposing content sources compete, often resulting in suboptimal bandwidth distribution (for example, one content source may utilize a disproportionate share of the bandwidth, starving the other content sources). Due to the lack of control, the CDN owner cannot guarantee quality levels to content sources on different tiers of service.

FIG. 1 is a simplified block diagram of an existing network architecture 10 for uploading content to a CDN 11. Content sources CS-1 through CS-4 12-15 may contend to upload content through the Internet 16 to a watch folder disk farm 17 in a datacenter 18 commonly accessible by the content sources and the CDN. In the illustrated example, CS-1 through CS-3 each utilizes an Internet connection having a maximum bandwidth of 100 Mbs to upload associated content. CS-4 utilizes an Internet connection having a maximum bandwidth of 30 Mbs. An inbound content virtual pipe 19 from the Internet to the watch folder disk farm has a maximum bandwidth capacity in the illustrated example of 200 Mbs. The inbound content is first received in the datacenter 18 in an input buffer 20, and is then retrieved and written to the watch folder disk farm 17. From the watch folder disk farm, a CDN distribution system 21 distributes the ingested content to the CDN 11, which may include an origin server 22 and multiple regional servers 23.

Each of the content sources 12-15 is programmed to grab as much bandwidth as is currently available, up to the maximum bandwidth of its Internet connection, when the content source has content to upload. Therefore, when more than two of the content sources in this example desire to simultaneously upload content, the maximum bandwidth capacity of the inbound content pipe 19 is exceeded. Any other content source that then attempts to upload content to the watch folder will be blocked. Thus, the system is essentially first-come-first-served. For example, if CS-1 and CS-2 are uploading content, CS-3 and CS-4 have to wait until CS-1 or CS-2 finishes its upload or pauses in its upload long enough for CS-3 or CS-4 to jump in and take its place. Of course, this can create additional problems if a content source partially uploads a content file and then cannot regain access to the watch folder disk farm 17 due to network bandwidth being grabbed by another content source.

SUMMARY

The present disclosure provides a system that manages the uploading of third-party content to a CDN's watch folder, for further distribution. Based on weighted pre-established policies, an ingestion controller in the CDN controls the speed for uploading content from each content source. When multiple content sources contend for network bandwidth and the total required bandwidth is more than a maximum bandwidth capacity of an inbound content pipe, the ingestion controller may limit the upload speed of each content source so that the total ingestion bandwidth utilized by the content sources equals the maximum bandwidth capacity of the inbound content pipe. When demand for network bandwidth decreases to a level equal to or less than the maximum bandwidth capacity of the inbound content pipe, the ingestion controller may allow the requesting content sources to upload their content at normal speeds.

It is an objective of the present disclosure to minimize or avoid making any modifications to the content sources. Therefore, in one exemplary embodiment, the ingestion controller may limit the upload speed of each content source by, for example, limiting the speed at which content is retrieved from associated input buffer queues associated with each of the content sources. The retrieval rate from each buffer queue is based at least on each associated content source's assigned bandwidth weighting. In one embodiment, the ingestion controller limits the disk write speed at which an operating system (OS) for the watch folder is allowed to retrieve each source's content from its associated input buffer queue and write the content to memory in the watch folder. This causes the input buffer queues associated with the content sources to fill, further causing a flow control mechanism in a transport network such as the Internet to control the flow of packets from each content source. When demand for network bandwidth decreases to a level equal to or less than the maximum bandwidth capacity of the inbound content pipe, the ingestion controller may allow the OS to write to memory at normal speeds, thereby allowing the content sources to send their content at their full rates. Premium users may be allocated faster disk write speeds compared to non-premium users during times of network contention. All users on a particular service tier may be allocated equal disk write speeds.

In one embodiment, a method for managing ingestion of electronic content in a CDN is disclosed. The content is received from one or more content sources through an inbound content pipe having a maximum bandwidth capacity. The method includes obtaining by an ingestion controller, a bandwidth weighting assigned to each of the one or more content sources, wherein the bandwidth weighting assigned to each content source corresponds to a fraction of the maximum bandwidth capacity of the inbound content pipe; and controlling by the ingestion controller, an upload rate from each content source based at least on each content source's assigned bandwidth weighting.

The ingestion controller may include an input buffer connected to a memory, wherein the input buffer is configured to receive the content from the one or more content sources in one or more input buffer queues associated with the content sources, and the memory is configured to store the received content upon retrieval from the input buffer. The controller may control the upload rate by controlling a speed at which content is retrieved from each queue of the input buffer based at least on each associated content source's assigned bandwidth weighting. Slowing the retrieval speed for a given input queue causes the given input queue to fill, thereby triggering a network flow control mechanism that causes the content source associated with the given input queue to slow its transmission rate in accordance with instructions from the flow control mechanism.

In another embodiment, an ingestion controller for managing ingestion of electronic content in a CDN is disclosed. The content is received from one or more content sources through an inbound content pipe having a maximum bandwidth capacity. The ingestion controller includes a database of bandwidth weightings assigned to each of the one or more content sources, wherein the bandwidth weighting assigned to each content source corresponds to a fraction of the maximum bandwidth capacity of the inbound content pipe. The controller also includes an input buffer configured to receive the content from the one or more content sources in one or more input buffer queues associated with the content sources; and a content retrieval mechanism configured to receive the bandwidth weightings from the database, and to retrieve content from the input queues at an upload rate for each content source based at least on each content source's assigned bandwidth weighting.

In another embodiment, a system for managing ingestion of electronic content in a CDN is disclosed. The content is received from one or more content sources through an inbound content pipe having a maximum bandwidth capacity. The system includes an operator Policy Management System (PMS) configured to assign bandwidth weightings to the one or more content sources, wherein the bandwidth weighting assigned to each content source corresponds to a fraction of the maximum bandwidth capacity of the inbound content pipe. The system also includes an ingestion controller configured to control the upload bitrate of each of the one or more content sources. The ingestion controller includes a database configured to store the bandwidth weightings assigned to each of the one or more content sources; an input buffer configured to receive the content from the one or more content sources in one or more input queues associated with the content sources; and a content retrieval mechanism configured to receive the bandwidth weightings from the database, and to retrieve content from the input queues at an upload rate for each content source based at least on each content source's assigned bandwidth weighting.

The system enables the CDN owner to offer premium services to content sources by providing them with priority upload speeds. Additionally, the system prevents a content source from utilizing a disproportionate share of the bandwidth at the expense of other content sources at the same tier. Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

Figure 1:
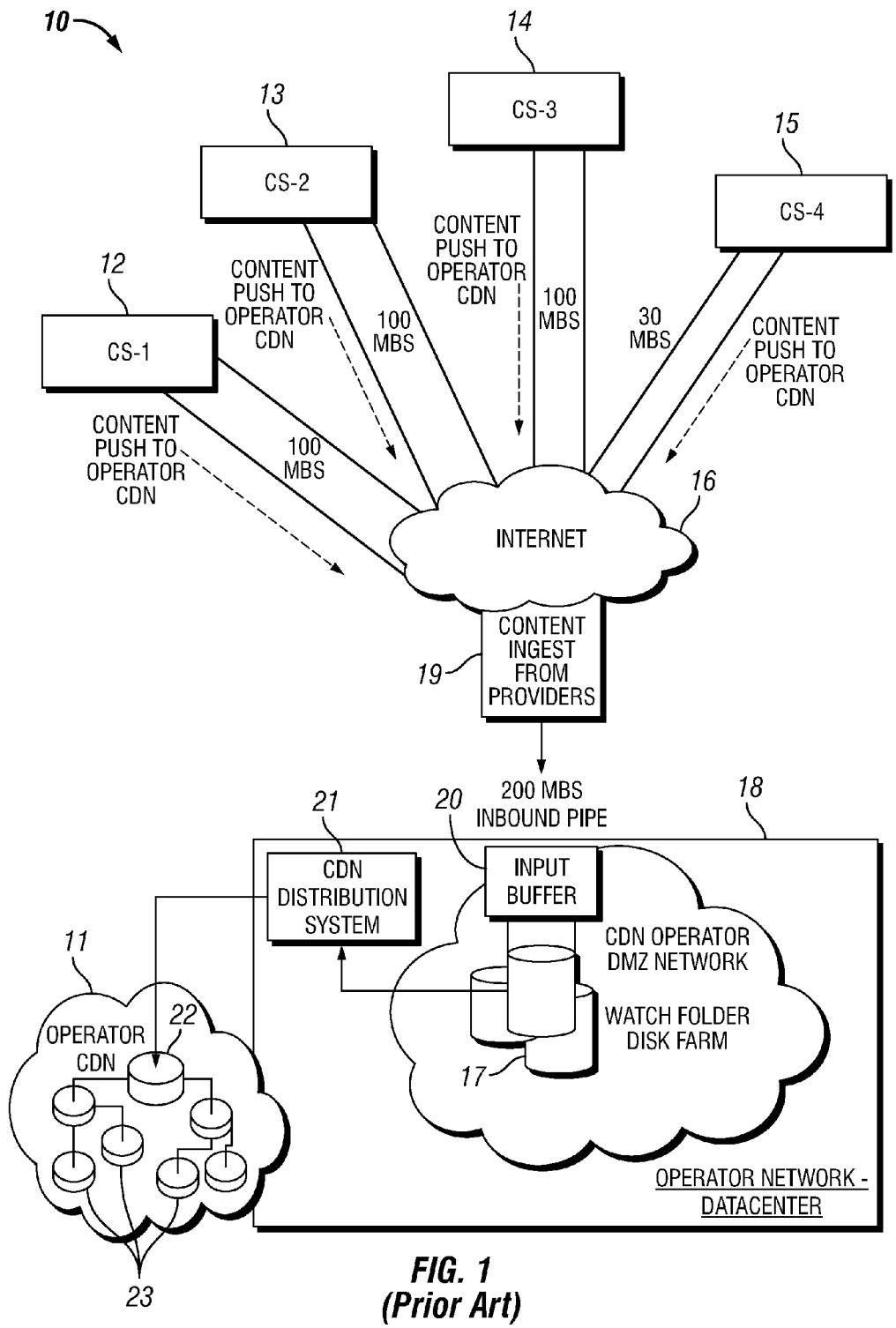
FIG. 1 (Prior Art) is a simplified block diagram of an existing network architecture for uploading content to a CDN.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of hardware and software stored on a non-transitory memory and executed by a general purpose computer or microprocessor.

Figure 2:
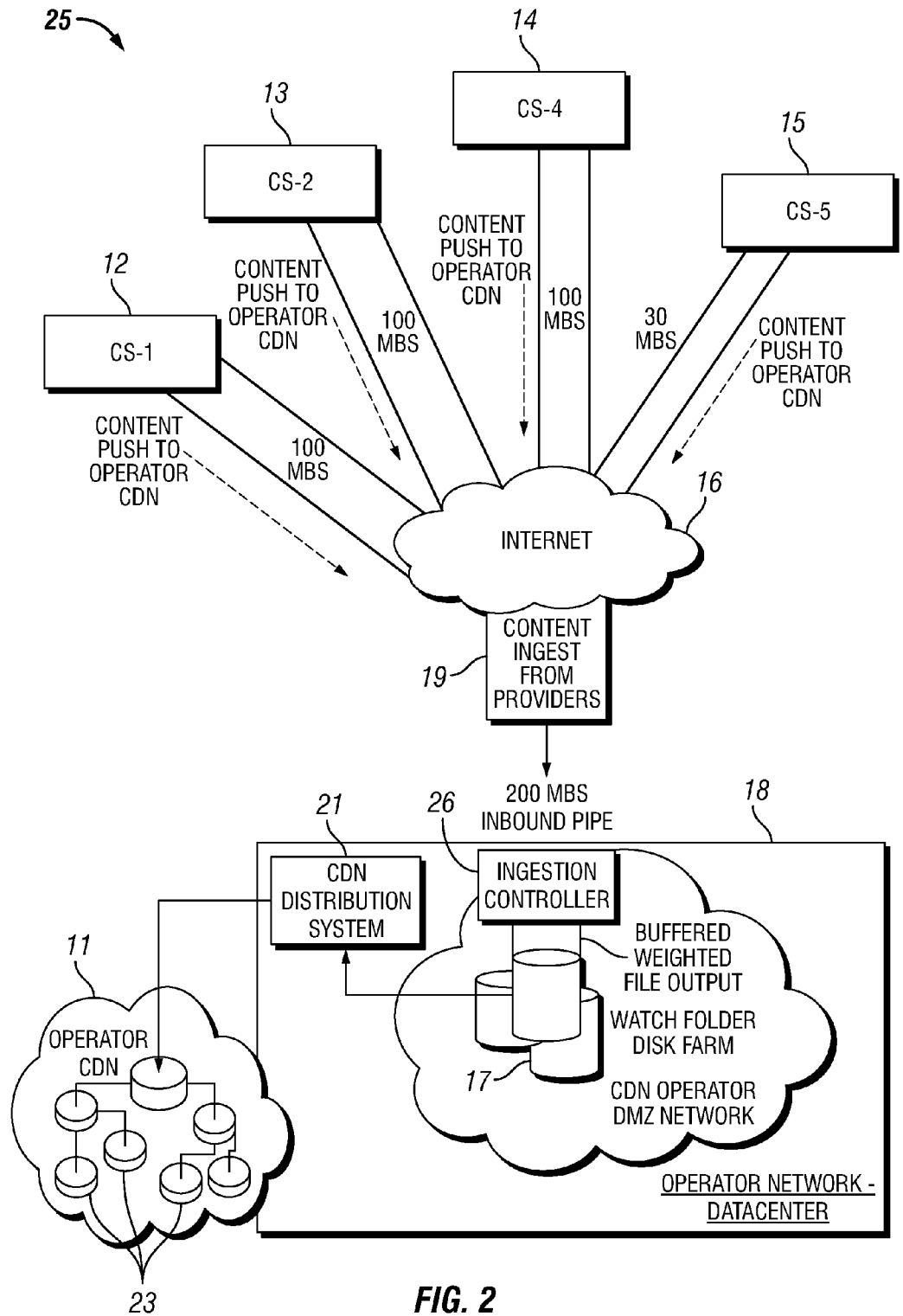
FIG. 2 is a simplified block diagram of an exemplary embodiment of a network architecture, including an ingestion controller for controlling the uploading of content to the CDN.

FIG. 2 is a simplified block diagram of a network architecture 25 for uploading content to the CDN 11 in accordance with certain embodiments. Content sources CS-1 through CS-4 12-15 may contend to upload content through a packet data network such as the Internet 16 to a watch folder disk farm 17 in a datacenter 18 commonly accessible by the content sources and the CDN. It should be understood that in the context of the present disclosure, the term "disk farm" is not intended to limit the watch folder functionality to a particular hardware implementation. The watch folder may be any suitable memory device having sufficient memory capacity and response time to store content from a plurality of content sources prior to forwarding the content to the CDN. For example, the memory device may be one or more of CPU registers, on-CPU cache, random access memory (RAM), on-disk cache, compact disks (CDs), solid state disks (SSDs), in-network (cloud) storage, tapes, and other backup media. In the remaining description herein, the watch folder functionality will be referred to simply as "the watch folder".

In the illustrated example, CS-1 through CS-3 each utilizes an Internet connection having a maximum bandwidth of 100 Mbs to upload associated content. CS-4 utilizes an Internet connection having a maximum bandwidth of 30 Mbs. The inbound content virtual pipe 19 from the Internet to the watch folder 17 has a maximum bandwidth capacity, which in the illustrated example is 200 Mbs. From the watch folder, a CDN distribution system 21 distributes the ingested content to the CDN 11, which may include an origin server 22 and multiple regional servers 23.

When multiple content sources contend for network bandwidth and the total required bandwidth is more than a maximum bandwidth capacity of the inbound content pipe 19, an ingestion controller 26 is configured to control the upload speed of each content source so that the total ingestion bandwidth utilized by the content sources is equal to or less than the maximum bandwidth capacity of the inbound content pipe. When demand for network bandwidth decreases to a level equal to or less than the maximum bandwidth capacity of the inbound content pipe, the ingestion controller may allow the requesting content sources to upload their content at normal speeds. Operation of the ingestion controller is described in more detail in connection with FIG. 4 below.

Figure 3:
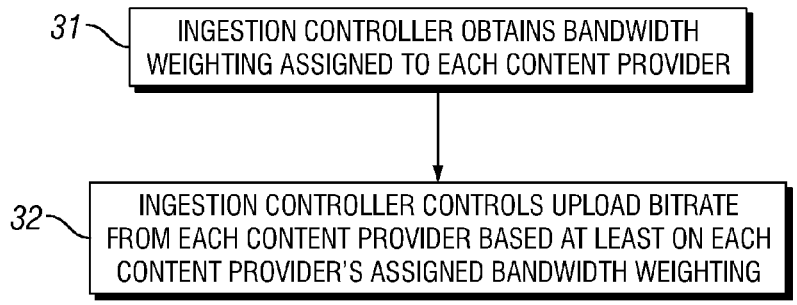
FIG. 3 is a flow chart of an exemplary embodiment of an overall method for controlling the uploading of content to the CDN.

FIG. 3 is a flow chart of an exemplary embodiment of an overall method for controlling the uploading of content from two or more content sources 12-15 to the CDN 11. At step 31, the ingestion controller 26 obtains a bandwidth weighting 42 assigned to each of the two or more content sources, wherein the bandwidth weighting assigned to each content source corresponds to a fraction of the maximum bandwidth capacity of the inbound content pipe 19. At step 32, the ingestion controller 26 controls an upload bitrate from each content source based at least on each content source's assigned bandwidth weighting 42.

Figure 4:
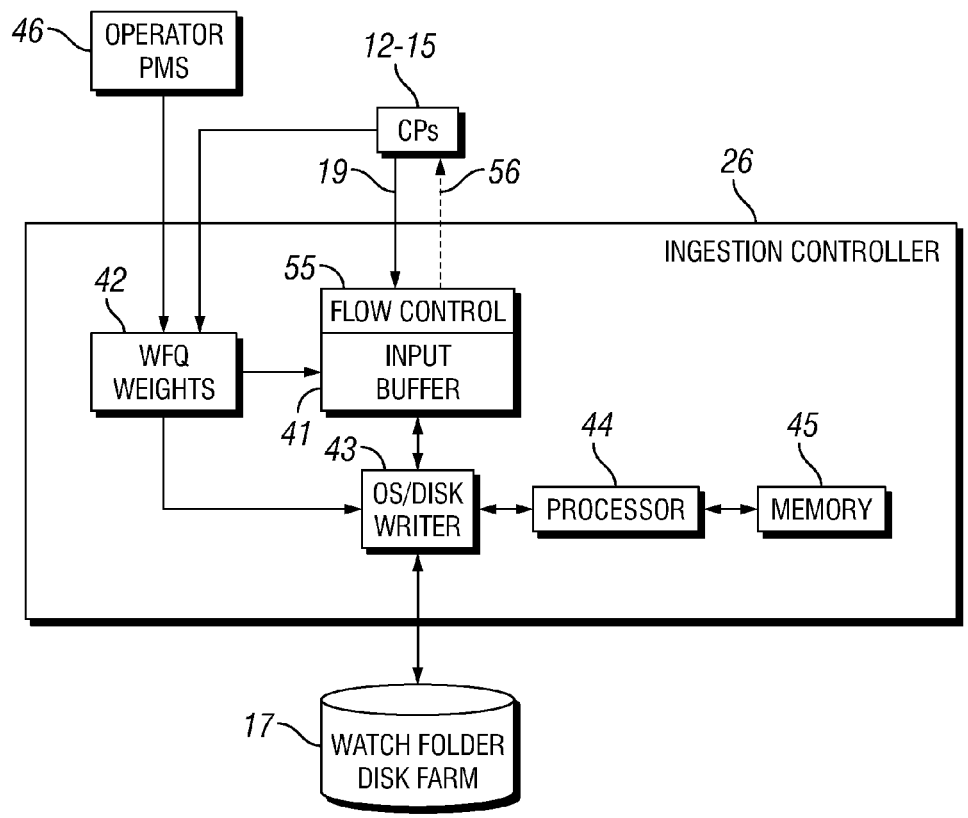
FIG. 4 is a simplified block diagram of an exemplary embodiment of the ingestion controller of FIG. 2.

FIG. 4 is a simplified block diagram of an exemplary embodiment of the ingestion controller 26 of FIG. 2. In the illustrated embodiment, the ingestion controller 26 includes an input buffer 41, which includes a flow control mechanism 55; a set of predefined Weighted Fair Queuing (WFQ) weights 42 associated with the content sources 12-15; and a disk writer 43 of an operating system (OS) of the watch folder 17. Operation of the ingestion controller may be controlled, for example, by a processor 44 executing computer program instructions stored on a memory 45.

The WFQ weights 42 include bandwidth weightings assigned by an operator Policy Management System (PMS) 46 to each of the content sources 12-15 depending upon network policies and the service tier of each content source. Each WFQ weight corresponds to a fraction of the maximum bandwidth capacity of the inbound content pipe 19 allocated to the associated content source. The PMS may dynamically assign the WFQ weights to the content sources as the level of contention for network bandwidth increases and decreases. As described in more detail below, each content source may also assign weights to individual streams of content within the content source's allocated bandwidth.

Figure 5:
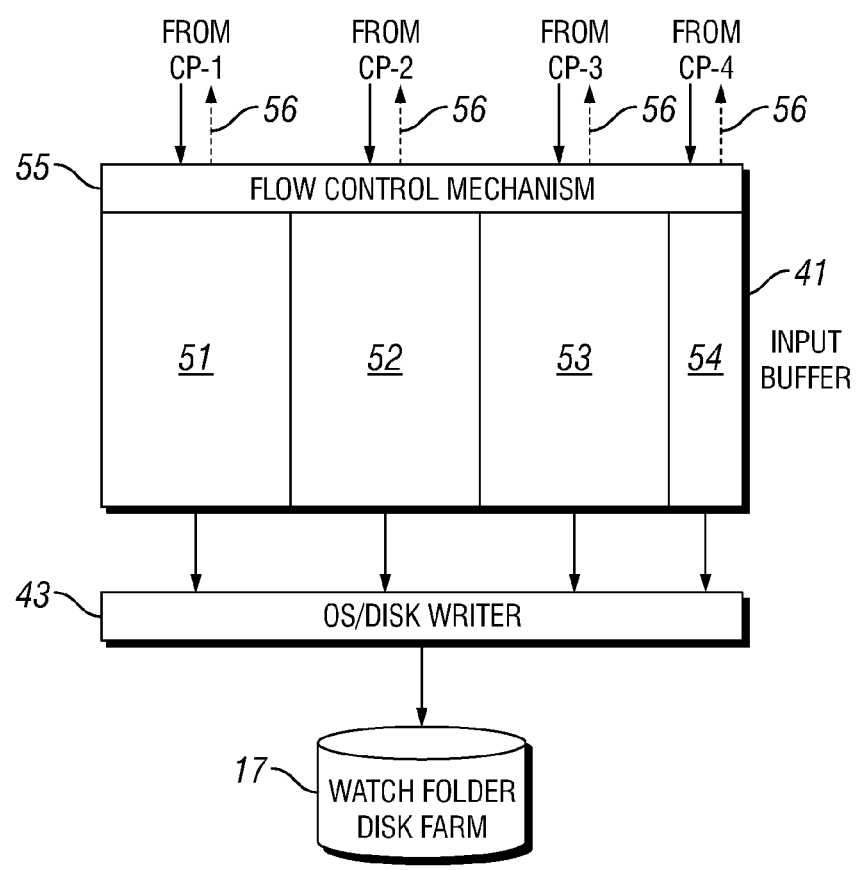
FIG. 5 is a simplified block diagram of an exemplary embodiment of the input buffer 31 of FIG. 3.

FIG. 5 is a simplified block diagram of an exemplary embodiment of the input buffer 41 of FIG. 4. The input buffer 41 may be configured to receive the content from the content sources in a plurality of input queues 51-54, wherein each input queue is associated with a different one of the content sources, CS1-CS4 12-15. Each queue may be sized in proportion to the allocated bandwidth of the associated content source. A flow control mechanism 55 interacts with the content sources to control each source's upload bitrate utilizing flow control instructions 56, as described in more detail below.

Figure 6:
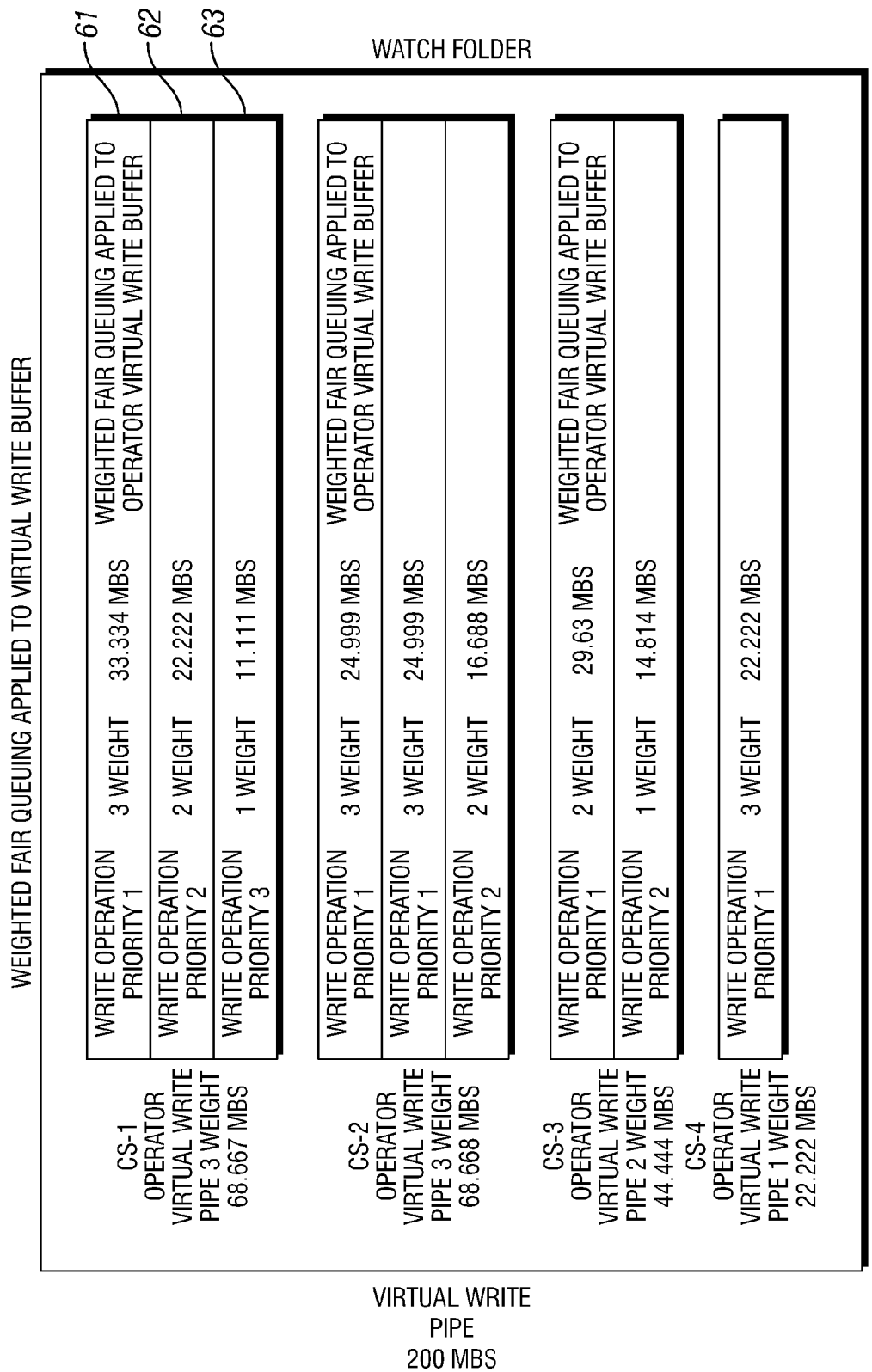
FIG. 6 is an exemplary embodiment of a table of Weighted Fair Queuing (WFQ) weights.

FIG. 6 is a functional block diagram of an exemplary embodiment of a table of WFQ weights 42 applied to the input buffer 41 for controlling bandwidth utilization by each content source. The left column shows WFQ weights, which may be applied by the PMS 46 to each of the content sources depending upon network policies and the service tier of each content source. Without the weights, each content source would attempt to transmit at its maximum rate, requiring an inbound content pipe with a bandwidth of 330 Mbs. However, the maximum capacity of the inbound content pipe is 200 Mbs, so the weights must reduce the maximum transmission rates to allowed transmission rates, the sum of which does not exceed 200 Mbs. In the illustrated example, CS-1 and CS-2 are assigned the level "3 Weight" (66.667 Mbs), CS-3 is assigned the level "2 Weight" (44.444 Mbs), and CS-4 is assigned the level "1 Weight" (22.222 Mbs). If a content source stops transmitting, or if another content source starts transmitting, the WFQ weights may be adjusted up or down to maintain the sum of the transmission rates within the 200 Mbs capacity.

A content source may upload multiple streams of content within the content source's allocated bandwidth. Such a multi-stream content source may further allocate bandwidth to individual streams of content according to priorities assigned by the multi-stream content source. For example, CS-1 12 may have three streams of content 61-63 to upload to the CDN and may divide its 66.667 Mbs among the three streams. As shown in this example, CS-1 assigns to the three streams of content, priority levels 1, 2, and 3, relating to bandwidths of 33.334 Mbs, 22.222 Mbs, and 11.111 Mbs, respectively. Multi-stream content sources CS-2 and CS-3 also assign varying priority levels to their multiple streams of content.

Figure 7:
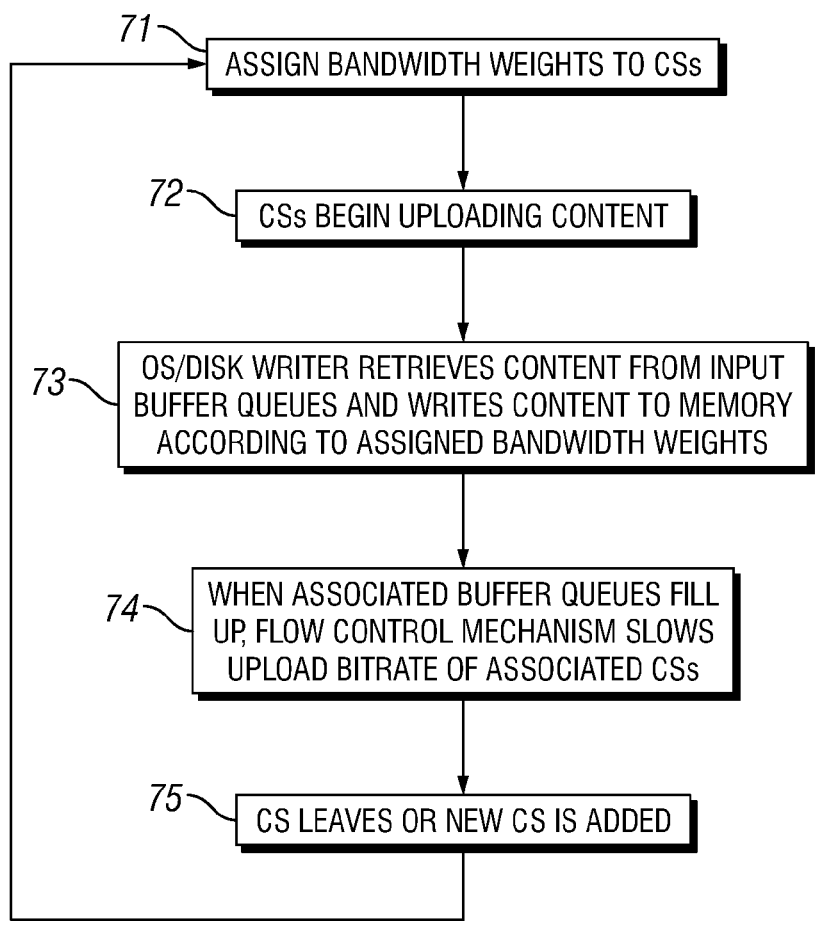
FIG. 7 is a flow chart illustrating in more detail, an exemplary embodiment of a method for controlling the uploading of content from two or more content sources to the CDN.

FIG. 7 is a flow chart illustrating in more detail, an exemplary embodiment of a method for controlling the uploading of content from two or more content sources 12-15 to the CDN 11. At step 71, the PMS 46, for example, assigns bandwidth weights to the CSs having content to upload to the CDN 11. The weights may be pre-configured and assigned to the CSs' network connections and the content flowing through the connections before the content is actually transmitted. The weights may also be changed during a transfer. At step 72, the CSs begin uploading their content. At step 73, the OS/disk writer 43 retrieves content from the input queues 51-54 of the input buffer 41 and writes the content to the watch folder 17 in accordance with the assigned bandwidth weightings. The ingestion controller causes the OS/disk writer to reduce the speed at which it retrieves content from the buffer queue for each content source in proportion to the WFQ weight 42 assigned to each content source and each individual stream, if applicable. The bandwidth weights do not affect the upload bitrates unless there are competing content transfers that exceed, or are calculated to exceed, the maximum bandwidth capacity of the inbound content virtual pipe 19. Only then does the ingestion controller 26 begin to control the ingestion speed.

Even though each content source desires to transmit content at the maximum bitrate of its connection to the Internet 16, the present disclosure utilizes the speed at which the OS/disk writer 43 retrieves the content from the buffer queues 51-54 and writes the content to the watch folder 17 to control the average upload bitrate of each content source so that the maximum bandwidth capacity of the inbound content pipe 19 is not exceeded. When the OS/disk writer 43 slows the retrieval speed for a particular content source, the queue in the input buffer 41 associated with that particular content source soon fills up. At step 77, the flow control mechanism 55 associated with the input buffer is triggered to slow the upload bitrate of the associated content source. The flow control mechanism may be, for example, the normal flow control mechanism of the Transaction Control Protocol (TCP) utilized for signaling over the Internet and other Internet Protocol (IP)-based networks. Flow control instructions 56 may be included in Acknowledgment messages sent from the input buffer 41 to each content source. The flow control instructions may indicate, for example, that the addressed content source is authorized to transmit a given number of data packets, but must then wait for further authorization before transmitting additional packets. At step 78, when a content source completes its upload or a new content source is added, the method returns to step 71 where the sum is recalculated and then reevaluated at step 72.

In this way, by controlling the buffer retrieval speed for each of the content sources 12-15, the ingestion controller 26 controls the amount of network bandwidth utilized by each content source. As the buffer retrieval speed for a particular content source is further limited, network bandwidth utilization by that content source is reduced since the source's input queue remains full for longer periods of time, and the flow control mechanism 55 further limits the number of packets the particular content source is permitted to transmit. Premium users may be allocated faster buffer retrieval and disk writing speeds compared to non-premium users during times of network contention. All users on a particular service tier may be allocated equal buffer retrieval and disk writing speeds.

Figure 8:
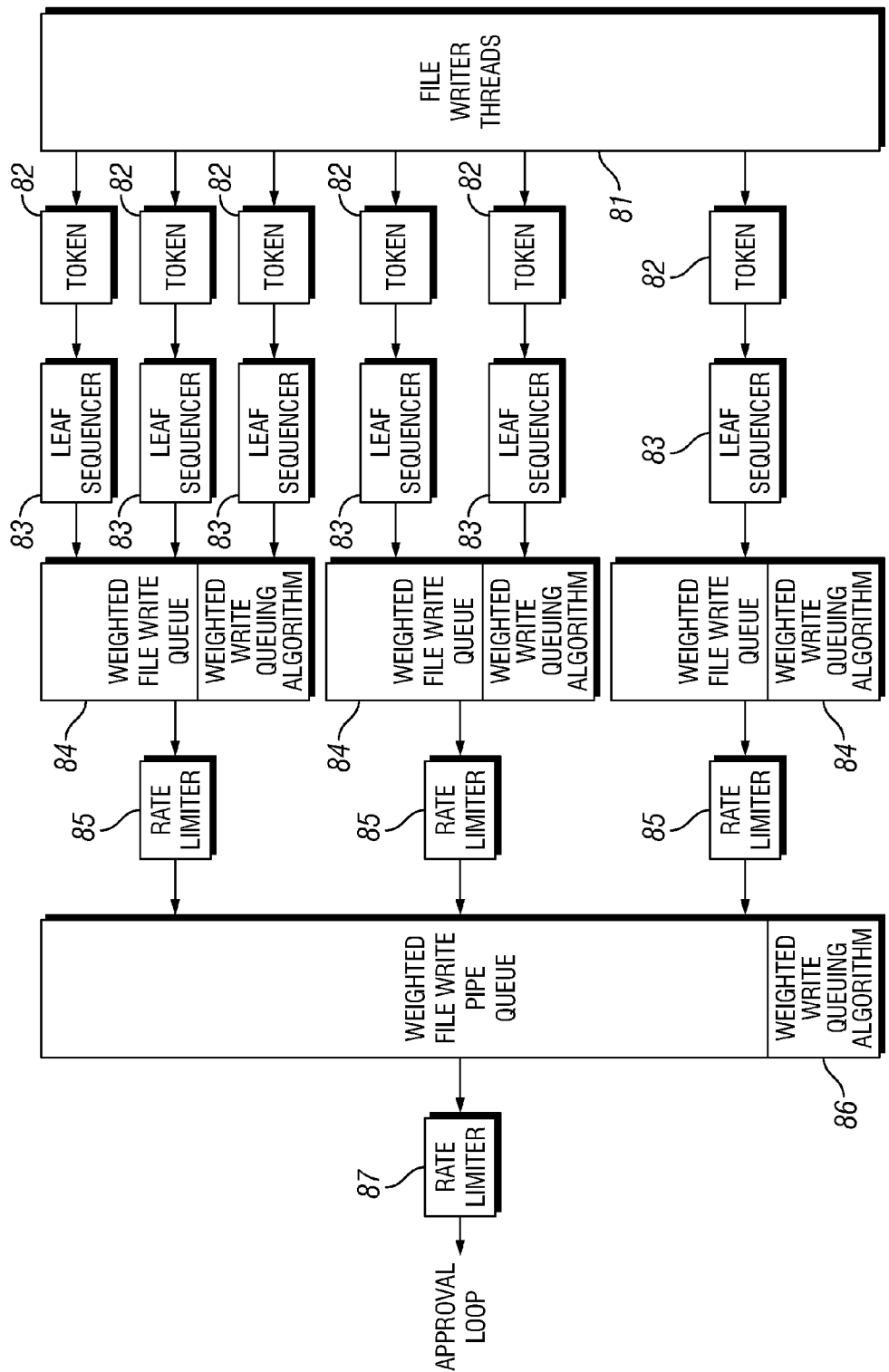
FIG. 8 is a block diagram of an exemplary embodiment of nested data structures in an approval framework utilized for writing the received content to the watch folder, thereby limiting the retrieval rate from the input buffer.

FIG. 8 is a block diagram of an exemplary embodiment of nested data structures in an approval framework utilized for writing the received content to the watch folder, thereby limiting the retrieval rate from the input buffer.

Figure 9:
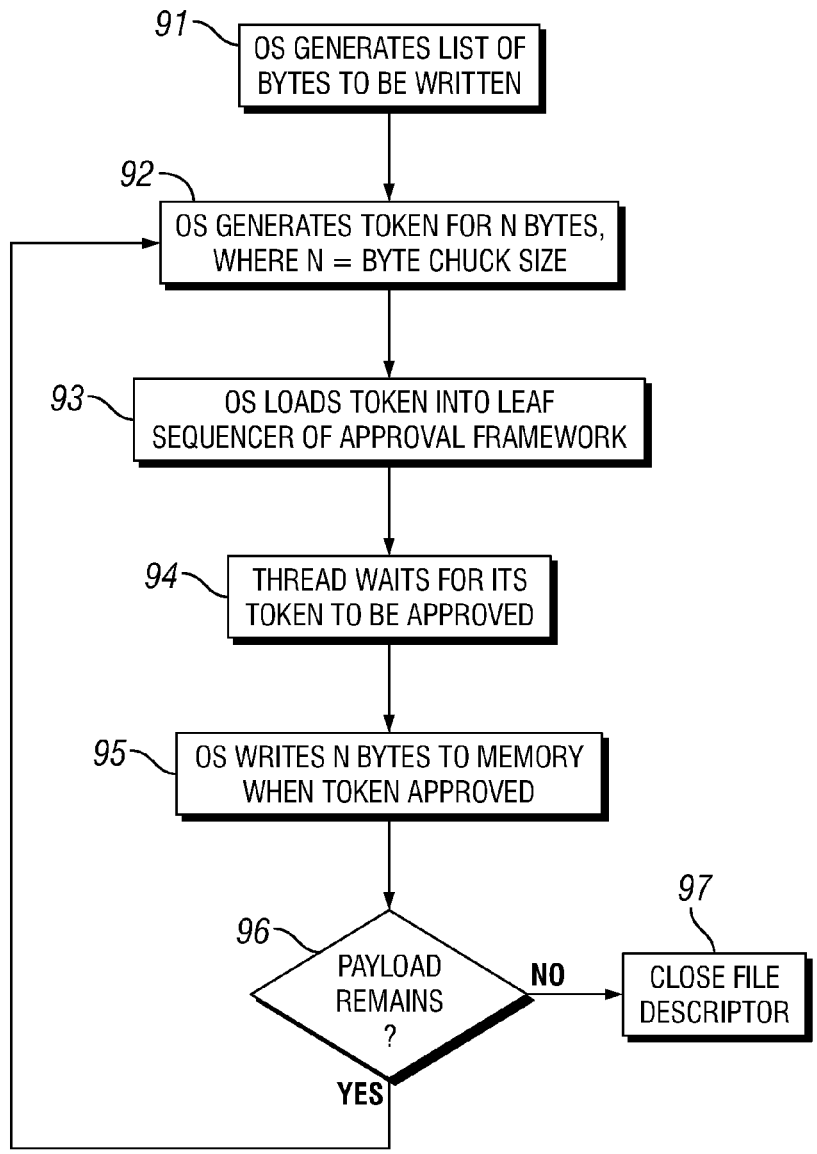
FIG. 9 is a flow chart schematically illustrating an embodiment of a method of writing threads (light-weight processes) to the watch folder.

FIG. 9 is a flow chart schematically illustrating an embodiment of a method of writing threads (light-weight processes) to the watch folder 17 (e.g., RAM, disk, etc.).

Together, FIGS. 8 and 9 illustrate an exemplary method of nesting data structures for determining which data streams to service and when to service them. Referring to FIG. 8, file writer threads 81 load tokens 82 into leaf sequencers 83. The leaf sequencers hold the tokens that come from the write threads. In various embodiments, the leaf sequencers may represent individual devices in a subscriber's household, or on-demand video assets from content sources. Weighted fair queuing (WFQ) sequencers 84 pull tokens from the leaf sequencers and apply a weighted write queuing algorithm 84 to the weighted file write queues 51-54. In various embodiments, the WFQ sequencers may be utilized to divide bandwidth between the various devices inside the subscriber's household or to divide bandwidth between the on-demand video assets from content sources. The weighted write queuing algorithm is described in more detail below.

A set of rate limiters 85 control the input rate into a weighted file write pipe queue 86. In various embodiments, the rate limiters 85 may represent households or content providers. A common WFQ sequencer 86, denoted as a weighted file write pipe queue, also applies the weighted write queuing algorithm to the data. The WFQ sequencer 86 has internal logic to select one of the rate limiters 85 to pull tokens from. A final rate limiter 87, with a different value than the rate limiters 85, gets tokens from the WFQ sequencer 86 and delays the tokens to keep the data rate below its configured limit. An approval loop pulls tokens out of the rate limiter 87 and approves them. The rate limiter 87 essentially calculates when the content packets should be transmitted by the CSs. When there is no congestion in the inbound content virtual pipe 19, the rate limiter calculates a time of transmission in the past, approving immediate transmission. When there is network congestion in the virtual pipe, the rate limiter calculates a time of transmission in the future, thus delaying transmission approval.

It should be noted that the rate limiters, WFQ sequencers, and leaf sequencers can be arranged into a number of different configurations to model different business needs.

Referring to FIG. 9, a writing process for a single thread is shown, with multiple threads being handled by the illustrated loop. At step 91, the disk writer 43 of the watch folder OS generates a list of bytes for a single thread to be written to memory. At step 92, the OS generates a token 82 for N bytes, where N equals the byte chuck size. At step 93, the token for the thread is loaded into the approval framework, namely one of the leaf sequencers 83. At step 94, the thread waits for its token to be approved. Once the token is approved, the N bytes are written to memory at step 95. At step 96, the OS determines whether any payload remains to be transmitted. If not, the method moves to step 97 where the file descriptor is closed. If payload remains, the method loops back to step 92 and repeats the process for another thread.

In one embodiment, the weighted write queuing algorithm may be expressed by the equation:

$$x_i = (A_i + Tb_i)/w_i$$

where:
$x_i$ is an intermediate value representing the estimated completion time of the transmission for accounting queue i in an imaginary bitwise round-robin model;
$A_i = \text{sum}(Qa_{ik})$, where $Qa_{ik}$ is a quantity of bytes for a previously approved token, k, from a write queue $Q_i$;
$Tb_i$ = the number of bytes for the current token from the write queue $Q_i$; and
$w_i$ = the weight factor for the write queue $Q_i$.

Thus, $A_i$ is the sum of the bytes already transmitted for queue i within an "accounting window". $A_i + Tb_i$ adds in the number of bytes for a candidate token. The weight $w_i$ corresponds to a "speed" for the transmission queue relative to other weighted streams.

By comparing the $x_i$ values for the various queues, it can be determined which packet will finish transmitting first in the imaginary bitwise round-robin scheme. That packet is chosen for transmission. The token from the queue $Q_i$ is approved where $x_i = \min(x_i)$. Tokens are reconciled according to weight.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for managing ingestion of electronic content in a Content Distribution Network (CDN), wherein the content is received from one or more content sources through an inbound content pipe having a maximum bandwidth capacity, the method comprising:
    obtaining by an ingestion controller within an Operator network Datacenter, a bandwidth weighting assigned to each of the one or more content sources depending upon network policies and service tiers of each content source, wherein the bandwidth weighting dynamically assigned to each content source corresponds to a fraction of the maximum bandwidth capacity of the inbound content pipe; and
    controlling by the ingestion controller, an upload rate from each content source based at least on each content source's assigned bandwidth weighting,
    wherein when two or more content sources are on the same service tier, the controlling includes:
        assigning by an operator Policy Management System (PMS), the same bandwidth weighting to each of the two or more content sources; and
        allocating by the ingestion controller, an equal fraction of the maximum bandwidth capacity of the inbound content pipe to each of the two or more content sources, and
    wherein when the one or more content sources are on different service tiers, the controlling includes:
        assigning by the operator PMS, a different, higher bandwidth weighting to a given content source on a higher service tier than a remainder of the one or more content sources; and
        allocating by the ingestion controller, a larger fraction of the maximum bandwidth capacity of the inbound content pipe to the given content source on the higher service tier.

2. The method as recited in claim 1, further comprising: receiving, by the ingestion controller, the content from the one or more content sources in one or more input buffer queues associated with the content sources, and storing the received content to a memory upon retrieval from the input buffer connected to the memory, wherein the controlling includes:

controlling a speed at which content is retrieved from each queue of the input buffer based at least on each associated content source's assigned bandwidth weighting, wherein slowing the retrieval speed for a given input queue causes the given input queue to fill, thereby triggering a network flow control mechanism that causes the content source associated with the given input queue to slow its transmission rate in accordance with instructions from the flow control mechanism.

3. The method as recited in claim 1, further comprising obtaining by the ingestion controller, a category weighting for individual streams of content coming from a multi-stream content source, wherein the controlling includes controlling the upload rate for each individual stream of content coming from the multi-stream contempt source based on the multi-stream content source's assigned bandwidth weighting and the assigned category weighting for the individual stream of content.

4. The method as recited in claim 3, wherein the category weighting is assigned by the multi-stream content source based on one or more of:
subject matter of each stream of content;
release date of each stream of content;
frequency of release of installments of each stream of content; and
expected demand for each stream of content.

5. An ingestion controller for managing ingestion of electronic content in a Content Distribution Network (CDN), wherein the content is received from one or more content sources through an inbound content pipe having a maximum bandwidth capacity, the ingestion controller comprising:

a database of bandwidth weightings, within an Operator network Datacenter, assigned to each of the one or more content sources depending upon network policies and service tiers of each content source, wherein the bandwidth weighting dynamically assigned to each content source corresponds to a fraction of the maximum bandwidth capacity of the inbound content pipe;

an input buffer that receives the content from the one or more content sources in one or more input buffer queues associated with the content sources; and a content retrieval mechanism that receives the bandwidth weightings from the database, and retrieves content from the input queues connected to a memory at an upload rate for each content source based at least on each content source's assigned bandwidth weighting, wherein the database receives the bandwidth weightings from an operator Policy Management System (PMS), wherein when two or more content sources are on the same service tier, the PMS assigns the same bandwidth weighting to each of the two or more content sources; and wherein when the same bandwidth weighting is assigned to each of the two or more content sources, the content retrieval mechanism retrieves content from the input queues for each of the two or more content sources at the same upload rate.

6. The ingestion controller as recited in claim 5, wherein the input buffer includes a network flow control mechanism, wherein when the content retrieval mechanism slows the retrieval speed for a given input queue, the given input queue fills, and the network flow control mechanism is triggered to send an instruction to the content source associated with the given input queue to slow its transmission rate in accordance with instructions from the flow control mechanism.

7. The ingestion controller as recited in claim 5, wherein when there are two or more content sources and a given content source is on a higher service tier than a remainder of the content sources, the PMS assigns a different, higher bandwidth weighting to the given content source on the higher service tier; and wherein the content retrieval mechanism retrieves content from the input queue of the given content source at a higher upload rate.

8. The ingestion controller as recited in claim 7, wherein the database is further receives from a multi-stream content source that is sending more than one content stream, a category weighting for each individual stream of content, wherein the content retrieval mechanism retrieves content from the input queue for each individual stream based on the multi-stream content source's assigned bandwidth weighting and the assigned category weighting for the individual stream of content.

9. The ingestion controller as recited in claim 8, wherein the category weighting is assigned by the multi-stream content source based on one or more of:
subject matter of each stream of content;
release date of each stream of content;
frequency of release of installments of each stream of content; and
expected demand for each stream of content.

10. A system for managing ingestion of electronic content in a Content Distribution Network (CDN), wherein the content is received from one or more content sources through an inbound content pipe having a maximum bandwidth capacity, the system comprising:

an operator Policy Management System (PMS) that assigns bandwidth weightings to the one or more content sources, wherein the bandwidth weighting dynamically assigned to each content source corresponds to a fraction of the maximum bandwidth capacity of the inbound content pipe; and an ingestion controller that controls the upload bitrate of each of the one or more content sources, the ingestion controller comprising:

a database that stores the bandwidth weightings assigned to each of the one or more content sources;

an input buffer that receives the content from the one or more content sources in one or more input queues associated with the content sources; and a content retrieval mechanism that receives the bandwidth weightings from the database, and retrieves content from the input queues at an upload rate for each content source based at least on each content source's assigned bandwidth weighting, wherein the database receives the bandwidth weightings from an operator Policy Management System (PMS), wherein when two or more content sources are on the same service tier, the PMS assigns the same bandwidth weighting to each of the two or more content sources; and wherein when the same bandwidth weighting is assigned to each of the two or more content sources, the content retrieval mechanism retrieves content from the input queues for each of the two or more content sources at the same upload rate.

11. The system as recited in claim 10, wherein the input buffer includes a network flow control mechanism, wherein when the content retrieval mechanism slows the retrieval speed for a given input queue, the given input queue fills, and the network flow control mechanism is triggered to send an instruction to the content source associated with the given input queue to slow its transmission rate in accordance with instructions from the flow control mechanism.

12. The system as recited in claim 10, wherein when there are two or more content sources and a given content source is on a higher service tier than a remainder of the two or more content sources, the PMS assigns a different, higher bandwidth weighting to the given content source on the higher service tier; and wherein the content retrieval mechanism retrieves content from the input queue of the given content source at a higher upload rate.

13. The system as recited in claim 12, wherein the database further receives from a multi-stream content source that is sending more than one content stream, a category weighting for each individual stream of content, wherein the content retrieval mechanism retrieves content from the input queue for each individual stream based on the multi-stream content source's assigned bandwidth weighting and the assigned category weighting for the individual stream of content.

14. The system as recited in claim 13, wherein the category weighting is assigned by the multi-stream content source based on one or more of:

subject matter of each stream of content;

release date of each stream of content;

frequency of release of installments of each stream of content; and expected demand for each stream of content.

* * * * *

UNITED STATES PATENT AND TRADEMARK OFFICE
CERTIFICATE OF CORRECTION

PATENT NO. : 8,973,073 B2  
APPLICATION NO. : 13/898125  
DATED : March 3, 2015  
INVENTOR(S) : Phillips et al.

Page 1 of 1

It is certified that error appears in the above-identified patent and that said Letters Patent is hereby corrected as shown below:

In the Claims

In Column 9, Line 20, in Claim 3, delete "contempt" and insert -- content --, therefor.

In Column 9, Line 37, in Claim 5, delete "weightings," and insert -- weightings --, therefor.

Signed and Sealed this
Twelfth Day of July, 2016

Michelle K. Lee
*Director of the United States Patent and Trademark Office*